(12) United States Patent
Singer et al.

(10) Patent No.: US 6,988,657 B1
(45) Date of Patent: Jan. 24, 2006

(54) WIRELESS PAYMENT PROCESSING SYSTEM

(76) Inventors: Irek Singer, 210 Hess Street, S., Hamilton, Ontario (CA) L8P 3P2; Gaby G. Baghdadi, 138 Bonis Avenue, Apt 1516, Scarborough, Ontario (CA) M1T 3V9; Andrzej Rok, 4202 Bridlepath Trail, Mississagua, Ontario (CA) L5L 3G1

( * ) Notice: Subject to any disclaimer, the term of this patent is extended or adjusted under 35 U.S.C. 154(b) by 0 days.

(21) Appl. No.: 10/990,568

(22) Filed: Nov. 18, 2004

Related U.S. Application Data

(62) Division of application No. 10/894,074, filed on Jul. 20, 2004.

(51) Int. Cl.
G06K 5/00 (2006.01)

(52) U.S. Cl. ............ 235/380; 235/492; 235/381; 235/493; 705/64; 705/75; 705/76; 705/78

(58) Field of Classification Search ............ 705/39–44, 705/64–69, 72, 76; 235/375, 380, 487, 492, 235/493

See application file for complete search history.

(56) References Cited

U.S. PATENT DOCUMENTS

| | | | | |
|---|---|---|---|---|
| 5,708,422 A * | 1/1998 | Blonder et al. | ............ | 340/5.41 |
| 5,764,789 A * | 6/1998 | Pare et al. | ............ | 382/115 |
| 6,016,476 A * | 1/2000 | Maes et al. | ............ | 705/1 |
| 6,023,682 A * | 2/2000 | Checchio | ............ | 705/18 |
| 6,789,966 B2 * | 9/2004 | Tanaka et al. | ............ | 400/354 |
| 2002/0062281 A1 * | 5/2002 | Singhal | ............ | 705/39 |
| 2002/0107791 A1 * | 8/2002 | Nobrega et al. | ............ | 705/39 |
| 2003/0004876 A1 * | 1/2003 | Jacobson | ............ | 705/41 |
| 2003/0055792 A1 * | 3/2003 | Kinoshita et al. | ............ | 705/67 |
| 2003/0078844 A1 * | 4/2003 | Takatori et al. | ............ | 705/17 |
| 2003/0101134 A1 * | 5/2003 | Liu et al. | ............ | 705/39 |
| 2003/0124978 A1 * | 7/2003 | Virtanen | ............ | 455/41 |
| 2003/0135470 A1 * | 7/2003 | Beard | ............ | 705/67 |
| 2004/0019564 A1 * | 1/2004 | Goldthwaite et al. | ............ | 705/44 |
| 2004/0122685 A1 * | 6/2004 | Bunce | ............ | 705/1 |
| 2004/0158532 A1 * | 8/2004 | Breck et al. | ............ | 705/74 |
| 2004/0199474 A1 * | 10/2004 | Ritter | ............ | 705/65 |
| 2004/0243517 A1 * | 12/2004 | Hansen | ............ | 705/64 |
| 2004/0267663 A1 * | 12/2004 | Karns et al. | ............ | 705/40 |
| 2004/0267664 A1 * | 12/2004 | Nam et al. | ............ | 705/41 |
| 2004/0267665 A1 * | 12/2004 | Nam et al. | ............ | 705/41 |
| 2005/0027543 A1 * | 2/2005 | Labrou et al. | ............ | 705/1 |
| 2005/0065875 A1 * | 3/2005 | Beard | ............ | 705/38 |
| 2005/0177521 A1 * | 8/2005 | Crosson Smith | ............ | 705/67 |

* cited by examiner

*Primary Examiner*—Karl D. Frech
*Assistant Examiner*—Daniel Walsh
(74) *Attorney, Agent, or Firm*—David W. Wong

(57) ABSTRACT

The transaction method is for secure payment by credit cards or debit cards for goods or services with the use or mobile devices. The payment authorization center delivers a public portion of the authorization token to the service provider via the existing communication channels and the private portion of the authorization token is delivered to the mobile device via SMS or USSD or e-mail short message. The mobile device delivers the private authorization token to the service provider via a private local network based on bluetooth, infrared or other short radio frequency based technology. The credit card or debit card number is never revealed and a temporary card token replaces it.

7 Claims, 4 Drawing Sheets

WIRELESS PAYMENT PROCESSING SYSTEM

This application is a divisional application of U.S. patent application Ser. No. 10/894,074 filed on 20 Jul. 2004 by the same applicants of this application.

FIELD OF INVENTION

This invention relates to credit card and debit card payment systems. Specifically, this invention relates to payment systems with the use of wireless devices such as cell phones or PDA's.

Every payment system has to be deployed in a context of customer-merchant interaction architecture and this invention is well suited to be deployed as part of a purpose Bluetooth application profile. The profile could be designed to enable the user to interact with a local environment using a variety of electronic devices such as cellular phones, PDAs, etc. The local environment is defined as a set of service offerings and interaction points that can be accessed and affected by the user. For example, the user will be able to complete a vending machine purchase, make a payment at a checkout counter or purchase a ticket at a train station.

Subsequent description of this invention will be presented in the context of Bluetooth profile environment. However this invention is applicable to any wireless payment environment.

BACKGROUND OF THE INVENTION

Credit card and debit card payment systems have been developed to enable cashless payment for goods and services at the point of purchase by the use of credit card or debit card. The cards are issued to users (card owners) by financial institutions such as banks, Credit Unions or Trusts and they represent identification of a bank account with the issuing financial institution. In order to enable the card owners to use the cards at the point of purchase locations payment systems have been developed that allow transfer of an electronic purchase request transaction to the financial institution for authorization against the user's bank account. Once the balance of the bank account is checked and determined sufficient to cover the requested purchase amount an authorization transaction is sent back to the point of purchase location, which in turn instructs the merchant that the purchase amount is guaranteed and the goods can be released to the card owner.

The biggest challenge facing any card payment system is security of the credit card information. This is especially difficult for credit card based systems where there is no Personal Identification Number (PIN) assigned to the card. In recent years VISA has introduced their own PIN for Visa cards only but that solution is not available on majority of credit cards in circulation. However, those types of solutions cannot solve the major weakness in the existing card payment systems that exclude the card owner from the transaction flow and solely rely on merchant—card issuer interaction to authorize the payment.

SUMMARY OF THE INVENTION

It is a principal object of the present invention to provide a card payment system that makes the card owner an integral part of the payment authorization flow.

It is another object of the present invention to provide a card payment system that creates a highly secured environment for exchanging credit or debit card information where the card number is never exposed.

It is another object of the present invention to provide a card payment system with an enhanced security for credit card financial transactions by implementing real time cardholder notification.

It is another object of the present invention to provide a card payment system that eliminates the use of encryption technology for exchanging credit or debit card information.

It is another object of the present invention to provide a public card vault facility so a card owner can register his/her list of cards to be used by him/her at merchant locations.

DETAILED DESCRIPTION OF THE PREFERRED EMBODIMENTS

Best Mode For Carrying Out the invention

Figure 1:
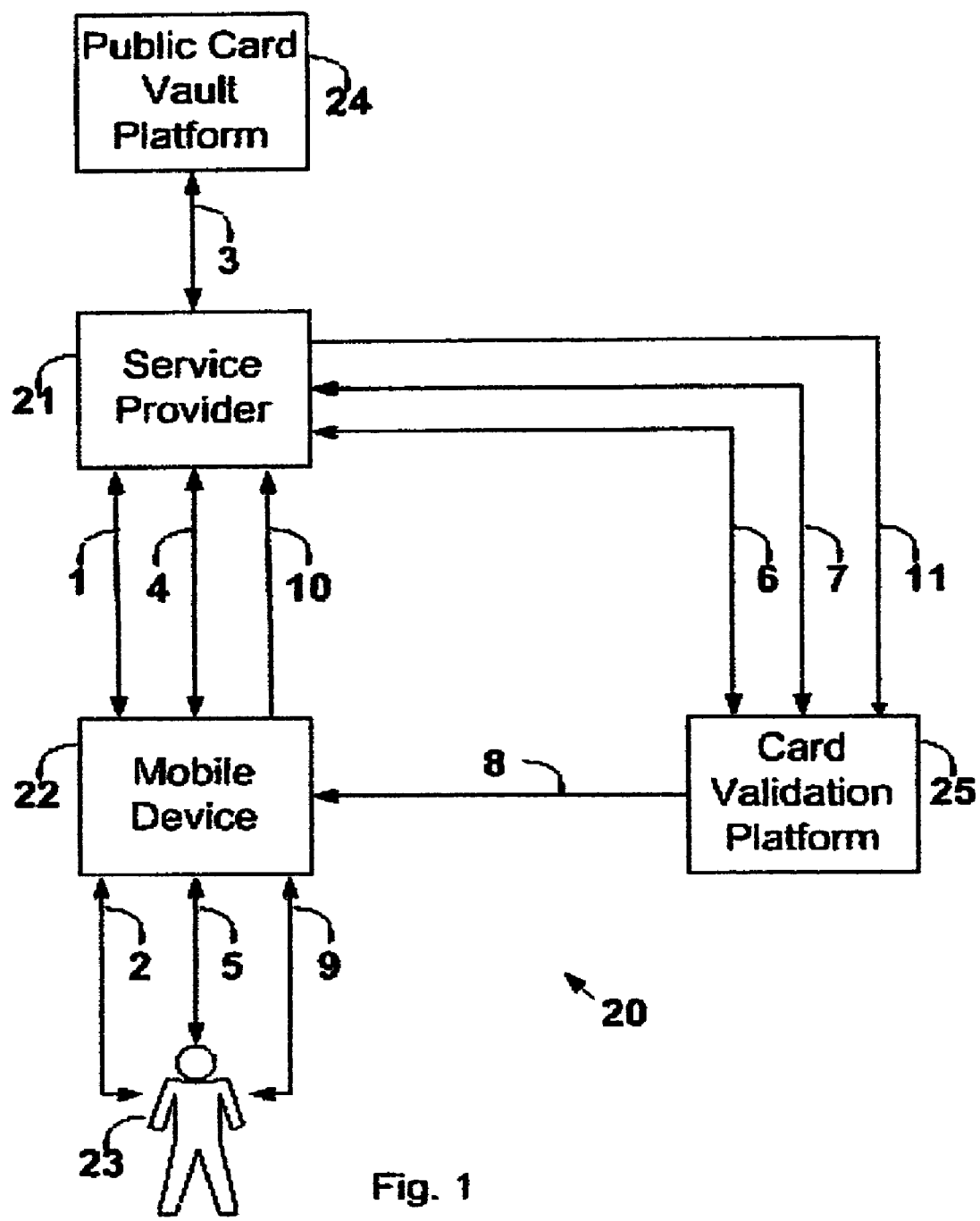
FIG. 1 is a schematic view of the card payment transaction authorization flow which comprises the system of the present invention.

Referring now to the drawings and particularly to FIG. 1 there is shown therein a schematic view of a transaction authorization process carried out with a preferred embodiment of the system of the present invention, which process is generally indicated 20. In the transaction authorization process carried out in connection with the invention, Service Provider 21, which in preferred embodiment is the Bluetooth Retail Server, is operated at the retailer location and is responsible for managing interaction with card owner 23 and the Card Validation Platform 25. A bank or other entities responsible for processing transactions operate the validation platform.

The card owner generally indicated 23, operates his Mobile Device 22 that is used to interact with Service Provider 21. The server uses some sort of interaction protocol, which in preferred embodiment is a Bluetooth Profile, to exchange messages with Mobile Device 22.

The card payment process starts with the Service Provider 21 sending GetCredential request message 1 to the Mobile Device 22. The credential token could be PIN, password or any biometric reading of the card owner's body (voice, retina scan, etc.), which in the preferred embodiment is providing voice token by the card owner 23 represented by activity GetCredential 2.

The Mobile Device 22 sends the credential token back to the Service Provider 21 along with Mobile device's International Mobile Equipment Identity (IMEI).

Next the Service Provider 21 sends GetCardList request message 3 to the Public Card Vault Platform 24 passing along the credential token and IMEI.

The Public Card Vault Platform is a repository of card names list for card owner's mobile device. Any card owner who wishes to create his card vault list would come to a Web based interface and create a new account for his mobile device by providing his/her mobile device's IMEI number and account credential token (i.e. voice token) and then s/he would select from the list of card names by financial institution. For each card name selected the card owner would provide last 2 digits of his/her card number, a credential token type for the card, and s/he would assign his own friendly display name for the card. The Card Vault Provider would store the card's financial Institution BIN number, last 2 digits of the card, display name, credential token type for each card selected and also credential token and its status (i.e. required/optional) for the account itself.

The Service Provider 21 sends the card name list obtained form the Public Card Vault Platform 24 to the Mobile Device 22 with SelectCard message 4. The card owner 23 selects one of the card names and action GetSelection 5 depicts that process.

Once the Service Provider 21 receives the card name selection information it sends the GetPreAuth request message 6 to the Card Validation Platform 25 passing along the amount, credential token for the card (i.e. voice token), IEMI, card BIN, and last 2 digits of the card. Based on that data set (voice token, Card BIN, and last 2 digits of the card, IMEI) the Card Validation Platform 25 can identify the card account and performs preauthorization for the requested amount. If the preauthorization succeeds then the Card Validation Platform 25 generates temporary Card token and sends it back to the Service Provider 21 in response. Of course the pre-requisite is that the card owner updates his card account with the card issuer and associates his card with IMEI and phone number of his mobile device.

Next, the Service Provider 21 sends GetAuth message 7 to the Card Validation Platform 25 passing along the transaction amount and card token. The Card Validation Platform 25 performs final authorization of the payment and sends back to the Service Provider 21 public portion of the authorization token for the authorized payment and check digit of private part of the authorization token. At the same time the Card Validation Platform 25 sends unsolicited SMSNotify message 8 to the card owner's phone number along with the card token and private part of the authorization token.

Once the Mobile Device 22 receives the SMSNotify message 8, it presents the Card Owner 23 the option to authorize the transaction 9. If the card owner selects to authorize the transaction then the Mobile Device 22 sends Authorize message 10 to the Service Provider 21 along with the card token and the private portion of the authorization token and by doing that it completes the payment transaction.

At this moment the Service Provider 21 has both public and private authorization tokens for a given card token so it verify private authorization tokens' check digit and then it can send Settle message 11 to the Card Validation Platform 25 to instruct the Card Validation Platform to transfer the money.

Note:

The described flow of messages assumes that the Credential Token Type specified for the cards in the Card Vault server is a 'VoiceTokenType' so there is no need to ask card owner for the credential token after his selection of a card from the list. If this is not the case then another message 1 will be sent between the Service Provider 21 and the Mobile Device 22 requesting credential token for the selected card.

Alternate Mode For Carrying Out the Invention

An alternate embodiment of the present invention can be applicable for closed card environments like Loyalty cards or private credit cards. In those systems the card can be accepted only at specific retail locations where the issuer of the private card provides transaction processing for those cards. In the embodiment of the present invention for the Loyalty type card systems the wireless devices' IMEI becomes the 'card' number therefore there will be substantial savings in operation of those systems. The closed card transaction processing system would perform two major functions from the point of view of the present invention. First it would provide functionality of the Public Card Vault Platform 24 (FIG. 1), and second it would store cross-reference between the Loyalty card in the form of the IMIE number and the real credit card number provided by the loyalty card holder.

Figure 2:
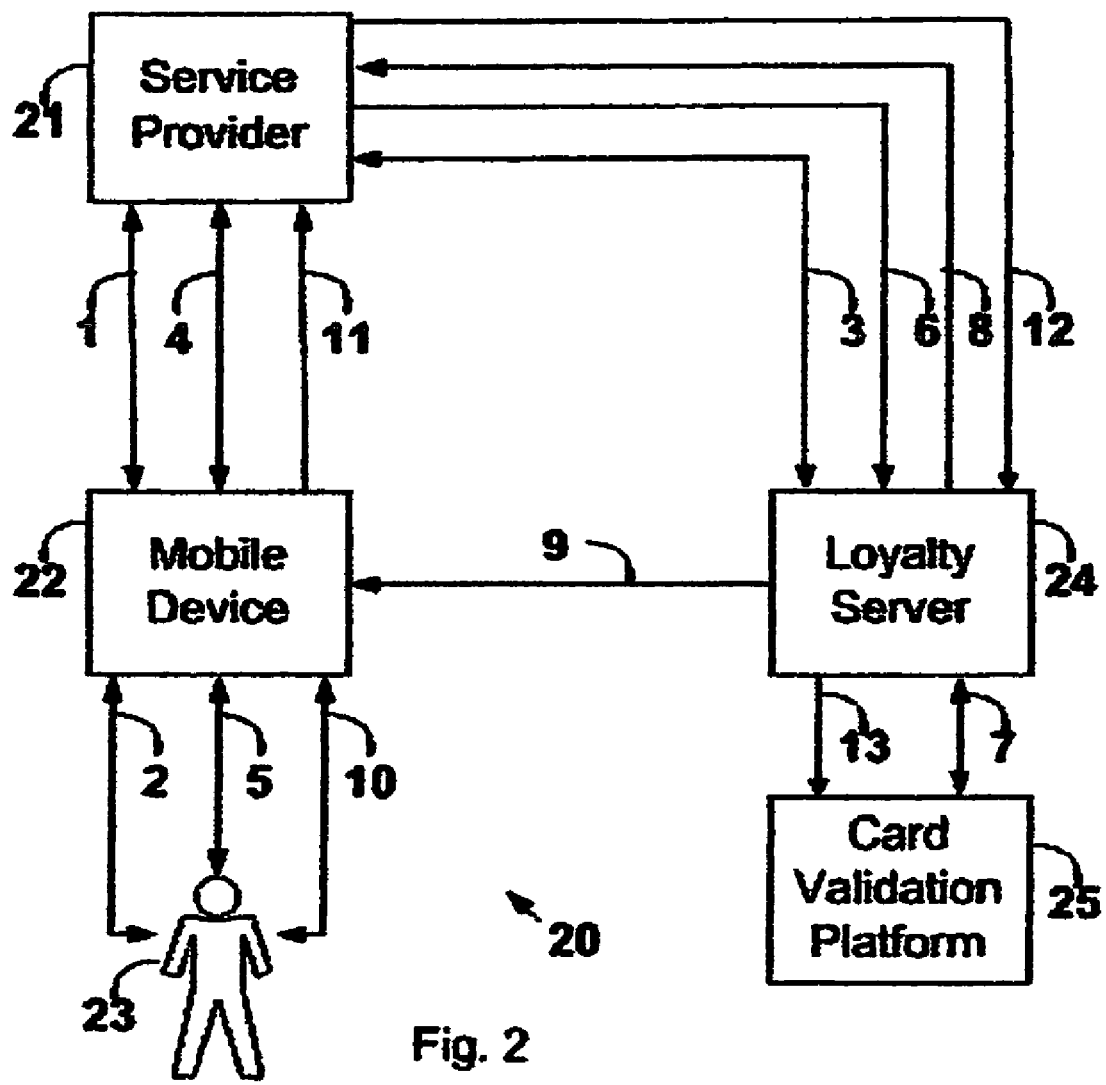
FIG. 2 is a schematic view of the card payment transaction authorization flow with alternate embodiment of the system of the present invention.

Referring now to the drawings and particularly to FIG. 2 there is shown therein a schematic view of a transaction authorization process carried out with an alternate embodiment of the system of the present invention, which process is generally indicated 20. In the transaction authorization process carried out in connection with the invention, Service Provider, which in alternate embodiment is the Bluetooth Service Provider 21, is operated at the retailer location and is responsible for managing interaction with Card Owner 23 and the Loyalty Server 24. The Loyalty Server 24 is responsible for maintaining the credit card names list and the correlation of the credit card numbers to the Loyalty card in the form of the IMIE number. Also the Loyalty Server 24 is responsible for interaction with the Card Validation Platform 25 to perform credit card transaction authorization.

The card owner generally indicated 23, operates his Mobile Device 22 that is used to interact with Service Provider 21. The server uses some sort of interaction protocol, which in alternate embodiment is Bluetooth Profile, to exchange messages with Mobile Device 22.

The card payment process starts with the Service Provider 21 sending GetCredential request message 1 to the Mobile Device 22. The credential token could be PIN, password or any biometric reading of the card owner's body (voice, retina scan, etc.), which in the alternate embodiment is a voice token provided by the Card Owner 23 represented by activity GetCredential 2.

The Mobile Device 22 sends the credential token back to the Service Provider 21 along with its (Mobile Device 22) International Mobile Equipment Identity (IMEI).

Next, the Service Provider 21 sends GetCardList request message 3 to the Loyalty Server 24, passing along the credential token and IMEI.

The Loyalty Server 24 is also fulfilling role of the Public Card Vault provider with one difference that the cardholder would also provide the credit card number and its expiration date. The Loyalty Server 24 would store securely the credit card number, its expiration date along with other data elements of standard Card Vault provider. The Loyalty Server 24 would become a trusted server once the cardholder releases the credit card information.

The Loyalty Server sends back the card name list along with the temporary Card token for each card name on the list.

The Service Provider 21 sends the card name list obtained form the Loyalty Server 24 to the Mobile Device 22 with SelectCard message 4. The Card Owner 23 selects one of the card names and action GetSelection 5 depicts that process.

This step can be omitted if there is only one card on the list.

Once the Service Provider 21 receives the card selection information, or there is only one card on the list, it sends the GetAuth request message 6 to the Loyalty Server 24, passing along the amount and the card token. Based on that data set the Loyalty Server 24 retrieves the correlated credit card number for that card token and sends GetCardAuth message 7 to the Card Validation Platform 25. The Card Validation Platform 25 performs its normal authorization processing and sends back the authorization number. The Loyalty Server stores the authorization information received from the Card Validation Platform 25 and generates its own Private and Public authorization tokens.

Next, the Loyalty Server 24 sends AuthResp message 8 back to the Service Provider 21 with public portion of the authorization token for the authorized payment and check digit of private portion of the authorization token. At the same time the Loyalty Server 24 sends unsolicited SMSNotify message 9 to the card owner phone number along with card token and private authorization token.

Once the Mobile Device 22 receives the SMSNotify message 9, it presents the Card Owner 23 the option to authorize the transaction 10. If the card owner selects to authorize the transaction then the Mobile Device 22 sends Authorize message 11 to the Service Provider 21 along with card token and the private authorization token and by doing that it completes the payment transaction.

At this moment the Service Provider 21 has both public and private authorization tokens for a given card token so it verify the check digit of private authorization token and then it can send Settle message 12 to the Loyalty Server 24, which in turn correlates the message to the real authorization information and sends Settle message 13 to the Card Validation Platform 25 to instruct the back to transfer the money.

Notification Mode For Carrying Out the Invention

Another alternate embodiment of the present invention can be applicable as security enhancement to the current credit card authorization system. Implementation of the present invention in the notification mode brings the card owner into the loop of the credit card authorization process. This mode is not fully secured from the perspective of the card owner but it provides the card owner with a notification every time a credit card transaction is attempted and it gives the card owner time to contact the bank and stop the transaction from going through settlement process.

Figure 3:
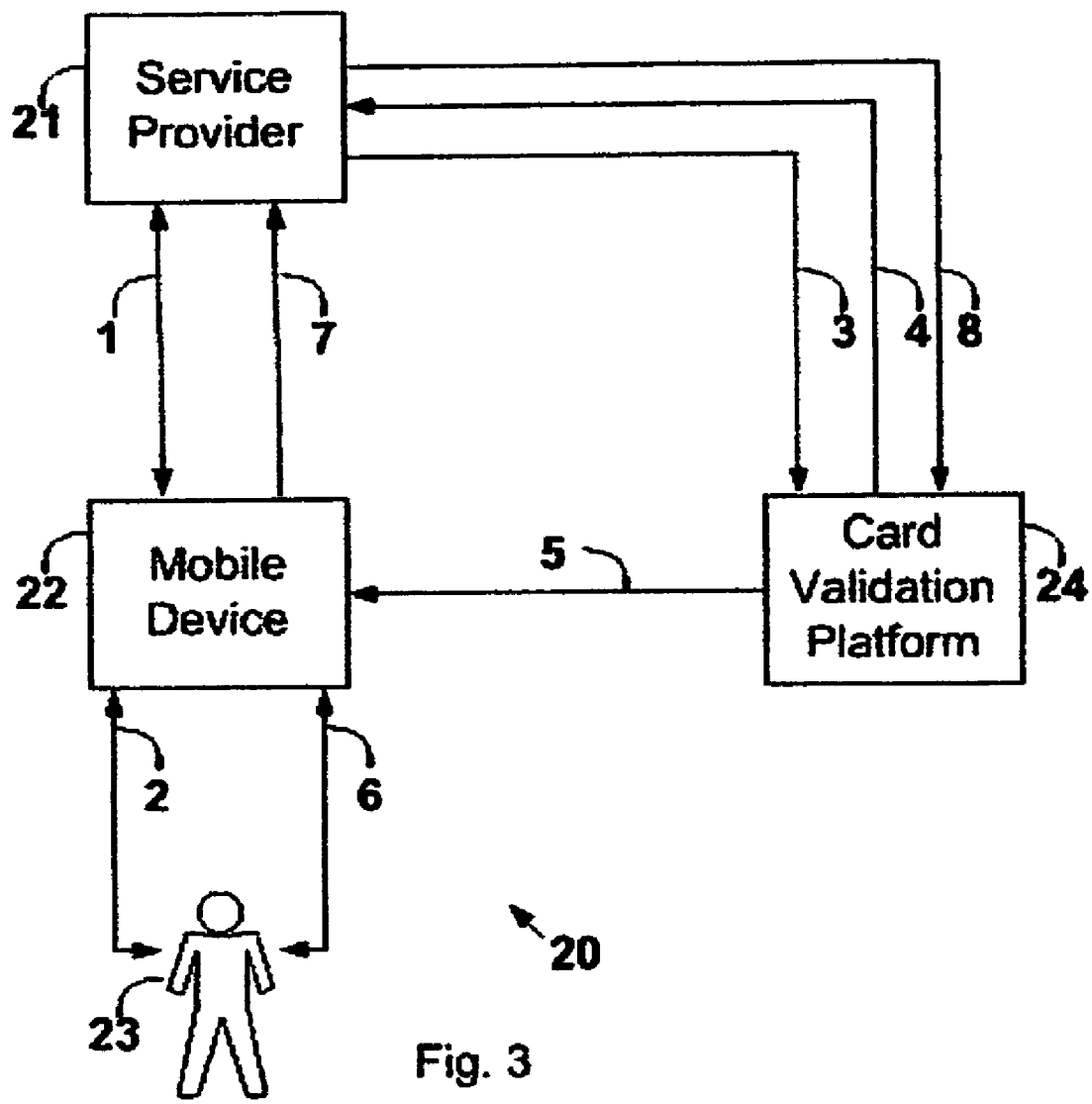
FIG. 3 is a schematic view of the card payment transaction authorization flow with alternate transaction flow providing notification based mode of the system of the present invention.

Referring now to the drawings and particularly to FIG. 3 there is shown therein a schematic view of a transaction authorization process carried out with an alternate embodiment of the system of the present invention in the notification mode, which process is generally indicated 20. In the transaction authorization process carried out in connection with the invention, service provider, which in alternate embodiment is the Bluetooth Service Provider 21, is operated at the retailer location and is responsible for managing interaction with Card Owner 23 and the Card Validation Platform 24. The Card Validation Platform 24 performs credit card transaction authorization.

The card owner generally indicated 23, operates his Mobile Device 22 that is used to interact with Service Provider 21. The server uses some sort of interaction protocol, which in alternate embodiment is Bluetooth Profile, to exchange messages with Mobile Device 22.

The card payment process starts with the Service Provider 21 sending GetCardInfo request message 1 to the Mobile Device 22, passing along the Reference Number to be used for subsequent authorization messages. The card information can be keyed in by the card owner (not practical), or retrieved from any type of secure storage applications on the Mobile Device 22 like 'Nokia Wallet'.

The Mobile Device 22 sends the card information to the Service Provider 21 along with its (Mobile Device 22) International Mobile Equipment Identity (IMEI).

Next the Service Provider 21 sends GetAuth request message 3 to the Card Validation Platform 24 passing along all information required by the currently defined credit card authorization protocols. Note that there is no change to the interaction between the Service Provider 21 and the Card Validation Platform 24 as we know it today.

Next, Card Validation Platform 24 sends AuthResp message 4 back to the Service Provider 21 with the transaction reference number and authorization number. Again note that there is no change to the interaction between the Service Provider 21 and the Card Validation Platform 24 as we know it today. At the same time the Card Validation Platform 24 sends unsolicited SMSNotify message 5 to the card owner's phone number along with a copy of the AuthResp message 4 sent to the Service Provider 21. The Card Validation Platform needs to maintain correlation between the credit card number and the card owner's cell phone number in order to support the notification mode of the present invention.

Once the Mobile Device 22 receives the SMSNotify message 5, it presents the Card Owner 23 the option to authorize the transaction 6. If the card owner selects to authorize the transaction then the Mobile Device 22 sends Authorize message 7 to the Service Provider 21 along with received message from the Card Validation Platform 24 and by doing that it completes the payment transaction.

At this moment the Service Provider 21 compares the two messages and if they match then the transaction is authorized so it can send Settle message 8 to the Card Validation Platform 24.

Alternate Embodiment of Notification Mode For Carrying Out the Invention

Another alternate embodiment of the present invention can be applicable as security enhancement to the existing credit cart authorization systems. This implementation of the present invention in the notification mode brings the card owner into the loop of the credit card authorization process. The card owner gets notification every time his credit card it used to perform transaction authorization and it gives the card owner time to contact the bank and stop the transaction from going through settlement process when the card owner perceives the transaction as fraudulent.

Figure 4:
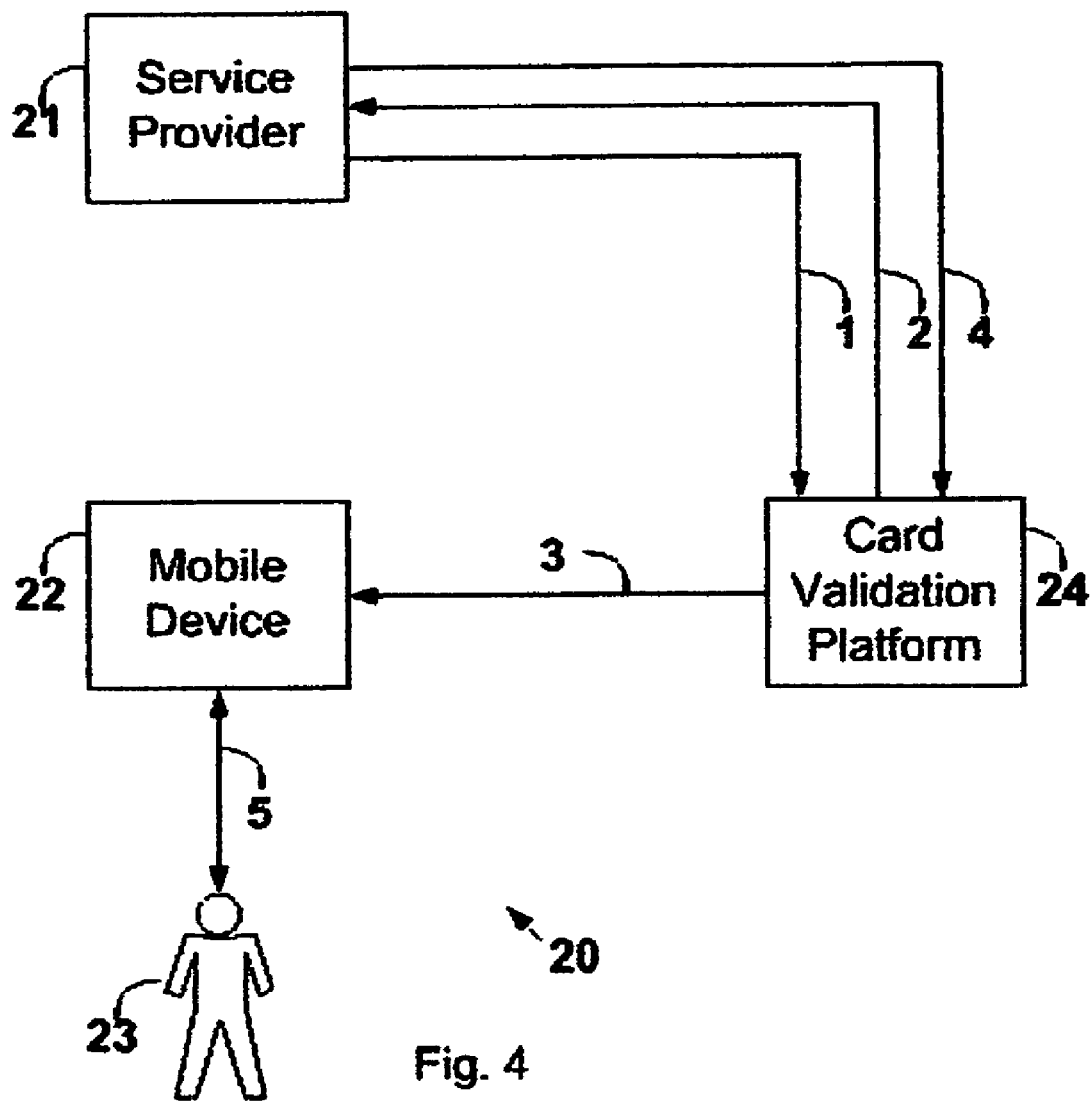
FIG. 4 is a schematic view of a transaction authorization process carried out with an alternate embodiment of the system of the present invention in the notification mode.

Referring now to the drawings and particularly to FIG. 4 there is shown therein a schematic view of a transaction authorization process carried out with an alternate embodiment of the system of the present invention in the notification mode, which process is generally indicated 20. In the transaction authorization process carried out in connection with the invention, Service Provider 21 is operated at the retailer location and is responsible for managing interaction with Card Owner 23 and the Card Validation Platform 24. The Card Validation Platform 24 performs credit card transaction authorization.

The Service Provider 21 sends GetAuth request message 1 to the Card Validation Platform 24 passing along credit card information obtained from the card owner in any presently known systems.

Next, the Card Validation Platform 24 sends AuthResp message 2 back to the Service Provider 21 with the transaction reference number and authorization number. At the same time the Card Validation Platform 24 sends unsolicited SMSNotify message 3 to the card owner phone number along with a copy of the AuthResp message 4 sent to the Service Provider 21. The bank needs to maintain correlation between the credit card number and the card owner's cell phone number in order to support the notification mode of the present invention.

The Card Owner 23 can review the notification messages and act when any of the transactions appears to be fraudulent.

While the preferred embodiments of the invention have been described above, it will be recognized and understood that various modifications may be made therein and the appended claims are intended to cover all such modifications which may fall within the spirit and scope of the invention.

What is claimed is:

1. A transaction method for displaying externally stored credit card selection list of a customer using a mobile device, comprising:
    transmitting a credential request from a service provider to said mobile device of said customer with a wireless communication network;
    transmitting a credential token from said mobile device along with at least an International Mobile Equipment Identity (IMEI) number of said mobile device back to said service provider;
    transmitting a card list request with at least said credential token and said International Mobile Equipment Identity (IMEI) number of said mobile device from said service provider to a Public Card Vault platform;
    transmitting said card list with at least card names, card Bank Identification Numbers (BINs) and last two digits of each card number from said Public Card Vault Platform to said service provider;
    transmitting said credit card list from said provider to said mobile device with a wireless system;
    displaying a credit card selection list on said mobile device.

2. A transaction method according to claim 1 wherein the credential token is an alphanumeric password code.

3. A transaction method according to claim 1 wherein the credential token is a voice sample of the customer.

4. A transaction method according to claim 1 wherein the credential token is a biometric customer identifier selected from fingerprint, retina scan and iris scan of said customer.

5. A transaction method according to claim 1 wherein said credit card is a bank debit card.

6. A transaction method according to claim 1 wherein said wireless communication system includes selectively a short range wireless radio network an infrared wireless network, a Short Message Service (SMS) network, and emails.

7. A transaction method according to claim 1 wherein said wireless communication network is an interface provided by said service provider and said private part of payment authorization token is entered manually into said interface.

* * * * *